United States Patent [19]

Triebel et al.

[11] Patent Number: 4,588,513
[45] Date of Patent: May 13, 1986

[54] NON-BORATE, NON-PHOSPHATE ANTIFREEZE FORMULATIONS CONTAINING DIBASIC ACID SALTS AS CORROSION INHIBITORS

[75] Inventors: Carol A. Triebel; Jerome W. Darden; Edward S. Peterson, all of Austin, Tex.

[73] Assignee: Texaco, Inc., White Plains, N.Y.

[21] Appl. No.: 672,736

[22] Filed: Nov. 19, 1984

[51] Int. Cl.$^4$ .............................................. C09K 5/00
[52] U.S. Cl. ........................................ 252/75; 252/74; 252/76; 252/77; 252/79
[58] Field of Search ................ 252/74, 75, 76, 77, 252/79

[56] References Cited

U.S. PATENT DOCUMENTS

| | | | |
|---|---|---|---|
| 2,726,215 | 12/1955 | Jones ................................ | 252/76 |
| 3,228,884 | 1/1966 | Daignault et al. ................ | 252/75 |
| 4,324,675 | 4/1982 | Barthold et al. .................. | 252/76 |
| 4,382,008 | 5/1983 | Boreland et al. .................. | 252/75 |
| 4,402,847 | 9/1983 | Wilson et al. .................... | 252/75 |
| 4,452,715 | 6/1984 | Hirozawa ......................... | 252/74 |

*Primary Examiner*—Paul Lieberman
*Assistant Examiner*—Robert A. Wax
*Attorney, Agent, or Firm*—Jack H. Park; Kenneth R. Priem; Richard A. Morgan

[57] ABSTRACT

A corrosion inhibited antifreeze composition using a three-part corrosion inhibitor mixture is described. A dicarboxylic acid component, an alkali metal silicate and a triazole comprise the three corrosion inhibitors. Use of this type of mixture permits the express exclusion of amines, nitrites, nitrates, chromates, borates and phosphates and their attendant disadvantages. Nevertheless, the inventive system provides excellent corrosion resistance in alcohol-based antifreeze, particularly with respect to aluminum.

2 Claims, No Drawings

NON-BORATE, NON-PHOSPHATE ANTIFREEZE FORMULATIONS CONTAINING DIBASIC ACID SALTS AS CORROSION INHIBITORS

BACKGROUND OF THE INVENTION

1. Field of the Invention

The invention relates to corrosion-inhibited aqueous solutions and particularly relates to corrosion-inhibited antifreeze compositions containing dicarboxylic acids useful as coolants in a heat exchange system such as the cooling system of an internal combustion engine.

2. Other Inhibitors Known in the Art

It is well known to use dicarboxylic acids as corrosion inhibitors in aqueous systems. For example, Jones in U.S. Pat. No. 2,726,215 teaches that dicarboxylic acids; namely, sebacic acid and azelaic acid, and their alkali and alkali metal salts are useful corrosion inhibitors in aqueous solutions. The use of a mixture of sodium sebacate (sodium salt of sebacic acid) and benzotriazole was disclosed as a useful corrosion inhibitor in engine coolants by G. Butler, et al. in "Inhibitor Formulations for Engine Coolants," *British Corrosion Journal,* Vol. 12, No. 3, 1977, pp 171–174.

U.S. Pat. No. 3,931,029 to Dutton, et al. teaches the use of certain unsaturated cycloalkylene dicarboxylic acids as antifreeze additives to inhibit corrosion of contacted solder alloys. Corrosion inhibitors containing an imidazoline derivative, a carboxylic acid or its metal salt and/or a phosphate are used for steel in brackish or acidic water according to *Chemical Abstracts,* Vol. 99, paragraph 126713x, 1983, which describes Japanese Kokai 58-84,981. U.S. Pat. No. 4,382,008 reveals a corrosion-inhibited antifreeze containing a triazole, an alkali metal borate, an alkali metal benzoate, an alkali metal silicate and an alkali metal salt of a $C_7$ to $C_{13}$ dibasic organic acid. The use of sodium sebacate as a corrosion inhibitor in phosphate-based antifreezes is further seen in the Derwent Abstract of Week E14 for French Certificate of Utility No. 2,489,355 to Perrot.

The Derwent Abstract of Week K18 for European Pat. No. 77,767-B teaches the use of water-soluble salts of dicarboxylic acids having at least three carbon atoms as antifreeze corrosion inhibitors. These acids are malonic, succinic, glutaric and adipic acids along with smaller proportions of $C_8$ and/or $C_{10}$ dicarboxylic acids. A mixture of a siloxane-silicate copolymer with an azole was found effective in reducing the corrosion of high-lead solder and aluminum in aqueous liquids according to U.S. Pat. No. 4,402,847 to Wilson, et al. U.S. Pat. No. 4,414,126 also to Wilson involves the use of alkali metal mercaptobenzothiazoles as effective inhibitors for the corrosion of high lead solder in aqueous systems.

However, a number of heretofore commonly accepted corrosion inhibitors have been found to have problems. Amines and nitrites are believed to form dangerous nitrosamines when used together. Nitrates and chromates have also been prohibited due to health and environmental concerns. Borax has been found to be aggressive towards aluminum; that is, aluminum-corrosive. Phosphates have also been found to be aggressive towards aluminum under nucleate boiling conditions. Therefore, it is an object of this invention to devise an antifreeze composition which contains no amines, nitrites, nitrates, chromates, borates or phosphates, but which still provides effective corrosion protection.

SUMMARY OF THE INVENTION

The invention concerns a corrosion inhibited antifreeze composition having a water-soluble liquid alcohol freezing point depressant and an inhibitor mixture. The inhibitor mixture has a dicarboxylic acid component, an alkali metal silicate and a triazole, but expressly excludes amines, nitrites, nitrates, chromates, borates and phosphates.

DETAILED DESCRIPTION OF PREFERRED EMBODIMENTS

It has been surprisingly discovered that a three component corrosion inhibitor mixture having a dicarboxylic acid component, an alkali metal silicate and a triazole, but specifically excluding amines, nitrites, nitrates, chromates, borates and phosphates, works as well in antifreeze formulations as do corrosion inhibitor mixtures having some of the less desirable additives.

The antifreeze formulations most commonly used include mixtures of water and water-soluble liquid alcohol freezing point depressants, such as glycols and glycol ethers. The glycols and glycol ethers which can be employed as major components in the present composition include glycols such as ethylene glycol, diethylene glycol, propylene glycol, and dipropylene glycol, and glycol monoethers such as the methyl, ethyl, propyl and butyl ether of ethylene glycol, diethylene glycol, propylene glycol and dipropylene glycol. Also useful are glycol diethers such as methyl and ethyl diethers of ethylene glycol, diethylene glycol and dipropylene glycol. Ethylene glycol is particularly preferred as the major antifreeze component.

It has been discovered that dicarboxylic acids serve as effective corrosion inhibitors in non-phosphate, non-borate antifreeze. For example, levels of 1.8 to 5.0 wt.% of sebacic acid in an antifreeze formulation are seen to be effective. The acid may be used in combination with other more conventional corrosion inhibitors such as benzoates and molybdates. This invention involves the use of a mixture of dibasic acids, silicates and azoles, which unexpectedly gives synergistic corrosion inhibiting results.

The dicarboxylic acid component may be any dicarboxylic acid or an alkali metal salt of dicarboxylic acid. Alkaline earth metal salts of dicarboxylic acids may also be useful. Preferably, the dicarboxylic acids should have from 8 to 12 carbon atoms, inclusive. This would include suberic (octanedioic), azelaic (nonanedioic), sebacic (decanedioic), undecanedioic and dodecanedioic acids and mixtures thereof. Sebacic acid is particularly preferred. Any alkali metal could be used to make the salt described, for example, lithium, sodium, potassium rubidium, and cesium, although sodium and potassium are preferred.

Silicates are the second essential feature of the invention. Some corrosion inhibitors are the alkali metal silicates, such as sodium metasilicate, potassium metasilicate and lithium metasilicate. Also useful are the silicates represented by the formula

$$[M_{(1/a)}O]_b SiO_{(4-b)\frac{1}{2}}$$

where M is a cation that forms a water-soluble silicate, a is the valence of the cation represented by M and b has a value from 1 to 3, inclusive. See U.S. Pat. Nos. 3,337,496 and 3,312,622. Sodium metasilicate pentahydrate is especially preferred.

The third essential component to the corrosion inhibitor mixture is an azole, such as alkali metal mercaptothiazoles and alkali metal tolyltriazoles. Benzotriazoles may also be effective. Sodium tolyltriazole is especially preferred.

The approximate proportions of the three main additives, based on the water-soluble liquid alcohol freezing point depressant proportion present are about 1.8 to 5.0 wt.% dibasic acid, calculated as the salt, about 0.14 to 1.0 wt.% alkali metal silicate and 0.05 to 0.5 wt.% azole. Especially preferred ranges are about 2.4 to 4.4 wt.% dibasic acid, about 0.2 to 0.3 wt.% silicate and 0.15 to 0.25 wt.% azole. As will be noted, it was discovered that low levels of silicate (less than or equal to 0.10 wt.% in combination with this additive package) has been found to be deleterious to aluminum heat rejecting surfaces, while slightly higher levels of silicate with dibasic acids are more effective than dibasic acids alone in protecting aluminum heat rejecting surfaces. Thus, the alkali metal silicate proportion should always be greater than 0.10 wt.% with economic constraints governing the upper end of this range.

As noted, amines, nitrites, nitrates, chromates, borates and phosphates are specifically excluded from the antifreeze compositions of this invention and is one of the reasons for its advantages. For example, the elimination of phosphate from the formulation removed many hard water compatability problems. Other problems which are eliminated herein were noted previously.

Other corrosion inhibitors and additives besides those expressly prohibited may be used such as benzoates (alkali metal benzoates, molybdates (alkali metal molybdates), various antifoaming agents and dyes, if desired, for example.

The invention will be further illustrated by the following examples which are not intended to limit the invention, but rather to illuminate it. Additionally, stabilizers may be added; such as, for example, polysiloxane stabilizers to prevent alkali metal silicate-caused gellation problems.

EXAMPLE 1

A blend of ethylene glycol, sodium sebacate (2.4 wt.%), sodium metasilicate pentahydrate (0.2 wt.%) and tolyltriazole (0.2 wt.%) was prepared and tested in the ASTM D-4340 Aluminum Heat Rejecting Surface Test with passing results. Results are presented in Table I below.

EXAMPLE 2

A blend of ethylene glycol, sodium sebacate (3.0 wt.%), sodium metasilicate pentahydrate (0.1 wt.%) and tolyltriazole (0.2 wt.%) was prepared and tested in the corrosion tests as Example 1. This blend failed the ASTM D-4340 Aluminum Heat Rejecting Surface Test as shown in Table I below.

EXAMPLE 3

A blend of ethylene glycol, sodium sebacate (2.7 wt.%) and tolyltriazole (0.2 wt.%) without a silicate was prepared and tested in the corrosion test as Example 1. The results are presented in Table I.

Other examples were conducted using the procedure outlined above except for the changes made as noted in Examples 4 through 10 of Table I.

TABLE I

Effect of Various Corrosion Inhibitor Mixtures in ASTM D-4340 Aluminum Heat Rejecting Test[1]

| Example | wt. % Sodium Sebacate | wt. % Sodium Metasilicate Pentahydrate | Weight Loss (mg/cm$^2$/wk) |
|---|---|---|---|
| 1* | 2.4 | 0.20 | 0.2 |
| 2 | 3.0 | 0.10 | 2.3 |
| 3 | 2.7 | none | 0.4 |
| 4* | 2.4 | 0.40 | 0.1 |
| 5 | 2.4 | 0.05 | 1.6 |
| 6[2] | 4.2 | 0.05 | 1.8 |
| 7[3] | 4.2 | 0.05 | 2.0 |
| 8 | 3.0[4] | 0.10 | 2.7 |
| 9[5] | 4.2 | none | 2.7 |
| 10[5] | 3.5 | 0.05 | 8.8 |
| ASTM spec., max. | | | 1.0 |

*Inhibitor mixtures of this invention.
[1] In all examples 0.2 wt. % tolyltriazole was also used. Ethylene glycol used as a freezing point depressant throughout.
[2] Prepared with a pH, in 33% concentration of 7.1.
[3] Same as Example 6 except pH adjusted to 8.4.
[4] 1.8 wt. % was sodium azelate; 1.2 wt. % was sodium dodecanedioate in place of sodium sebacate.
[5] Borax also present in mixture.

From these examples, it may be seen that the formulation of this invention (Example 1) performs better in the aluminum heat rejecting surface test than one similar to it but without the silicate (Example 3) or with a low level (0.1 wt.%, Example 2) of silicate.

Example 4 presents another example of this invention where the silicate level is high enough to pass the aluminum heat rejecting test. The test was failed by the mixtures of Examples 5 and 8 where the silicate proportion was too low. In Examples 6 and 7, the silicate proportion was also too low, and the adjusted pH of the formulation probably also had a deleterious effect on the aluminum test results. Further, the use of borax in the mixtures of Examples 9 and 10 further provided failing results as has been noted.

The compositions of this invention may be further modified by one skilled in the art without departing from the spirit and scope of this invention, which are defined only in the appended claims. For example, a particular combination of dicarboxylic acid or salt thereof and alkali metal silicate or azole may prove to be particularly advantageous.

We claim:
1. A corrosion inhibited antifreeze composition consisting of a water-soluble liquid alcohol freezing point depressant and an inhibitor mixture consisting of
   a. about 1.8 to 5.0 wt.% of sodium sebacate,
   b. about 0.14 to 1.0 wt.% of sodium metasilicate pentahydrate, and
   c. about 0.05 to 0.5 wt.% of tolyltriazole, all based on the amount of liquid alcohol freezing point depressant present, in the absence of amines, nitrites, nitrates, chromates, borates and phosphates.

2. The corrosion inhibited antifreeze composition of claim 1 in which the liquid alcohol freezing point depressant is ethylene glycol.

* * * * *